No. 758,885. PATENTED MAY 3, 1904.
J. W. AYLSWORTH.
ARMOR FOR PNEUMATIC TIRES.
APPLICATION FILED SEPT. 13, 1902.
NO MODEL.
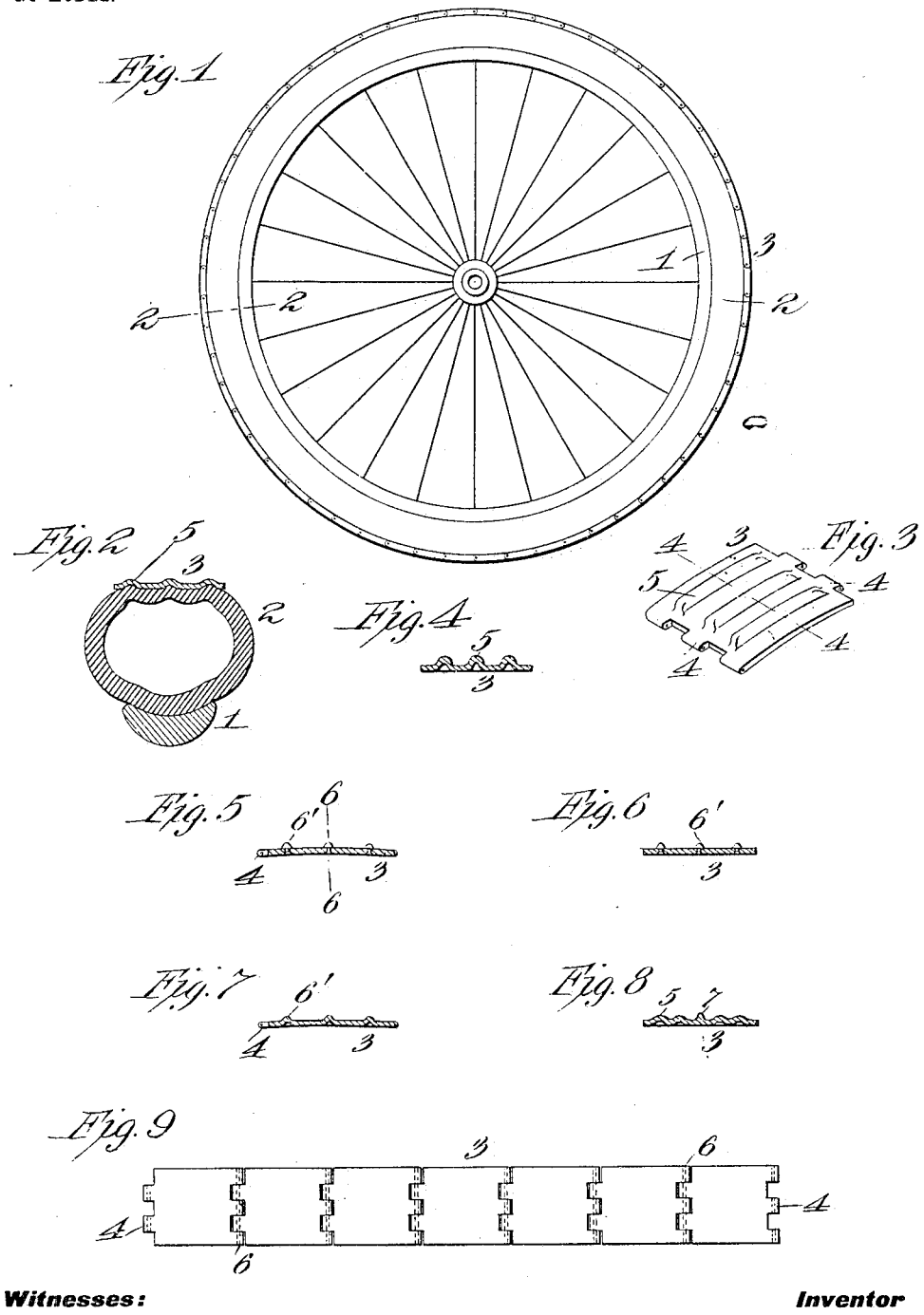
Witnesses:
Jas. F. Coleman
Jno. Robt Taylor
Inventor
Jonas W. Aylsworth
by Dyer Edmonds & Dyer
Attorneys No. 758,885. Patented May 3, 1904.

UNITED STATES PATENT OFFICE.

JONAS W. AYLSWORTH, OF EAST ORANGE, NEW JERSEY.

ARMOR FOR PNEUMATIC TIRES.

SPECIFICATION forming part of Letters Patent No. 758,885, dated May 3, 1904.

Application filed September 13, 1902. Serial No. 123,203. (No model.)

*To all whom it may concern:*

Be it known that I, JONAS W. AYLSWORTH, a citizen of the United States, residing at East Orange, in the county of Essex and State of New Jersey, have invented a certain new and useful Improvement in Armors for Pneumatic Tires, of which the following is a specification.

My invention relates to improvements in armors for pneumatic tires designed to protect the tires from puncture and abrasion; and my object generally is to provide and produce an improved armor which shall be capable of ready application to tires of different sizes and types and which while affording the desired protection to the tire will not affect the resilient properties of the latter in use.

Broadly stated, the invention consists of a series of links, either flat or segmental, made of metal or other tough rigid material and flexibly connected together to form a strong flexible resistant band. This flexible band or armor is applied to the periphery of the tire while the latter is deflated and is held rigidly in position when the tire is inflated by the compression exerted between the rim of the wheel and said band or armor.

My invention also contemplates improved details for increasing the efficiency of the device and which are preferably, though not necessarily, employed in practice. For instance, it is desirable in practice to form the links with longitudinal corrugations to prevent side slip, or instead thereof the links may be provided with spurs or projections for the same purpose, or both the corrugations and the spurs or projections may be employed together, whereby the tire is not only protected against side slip, but the tractive effect is increased.

My improved flexible armor possesses advantages over other devices for the purpose with which I am familiar. In the first place the armor can be fitted to tires of any desired diameter merely by increasing or decreasing the number of links and by the employment of one or more fractional links when the adjustment is made within narrow limits. In the second place, the armor or band being made of many segments or links having movable joints between them, its use does not detract objectionably from the resilient properties of the tire as would be the case with a metallic armor formed of a single band.

In order that the invention may be better understood, attention is directed to the accompanying drawings, forming a part of this specification, and in which—

Figure 1 is a side view of a vehicle-wheel equipped with a pneumatic tire, showing my improved armor applied to the same. Fig. 2 is a cross-sectional view, on an enlarged scale, on the line 2 2 of Fig. 1. Fig. 3 is a separate perspective view of a flat corrugated link. Fig. 4 is a section on the line 4 4 of Fig. 3. Fig. 5 is a side view of a flat link provided with spurs instead of corrugations to prevent side slip as well as to increase the tractive effect. Fig. 6 is a section on the line 6 6 of Fig. 5. Fig. 7 is a detail sectional view showing the formation of projections by striking up the metal by means of dies. Fig. 8 is a cross-sectional view showing a link provided with corrugations and a central longitudinal rib; and Fig. 9 is a plan view of a portion of an armor, illustrating the joints between the links and showing the employment of plain flat links.

In the above views corresponding parts are represented by the same numerals of reference.

The wheel shown in Fig. 1 is provided with a rim 1, having a pneumatic tire 2 of any suitable type applied to the same.

3 represents the armor, which is formed of a series of links flexibly connected together and either flat or segmental transversely. These links are preferably made of sheet-steel; but they may be formed of any other metal or of any other suitable hard, tough, and resistant material. The links are flexibly connected together by any suitable joint. For example, they may be provided with eyes 4, formed integrally with each link, interlocking together and mounted on pintles 6, having riveted heads. (See Fig. 9.) If desired, the links may be provided with longitudinal corrugations 5 (see Figs. 3 and 4) for preventing side slip. Instead of these corrugations each link may be formed with a series of projections, 6 (see Figs. 5 and 6,) which not only reduce side slip, but also increase the tractive effect. As shown in Figs. 5 and 6, these projections may be separately applied to the links by riveting, or they may be struck up from the metal of the links, as shown in Fig. 7. If desired, the links may be corrugated and also be provided with a central rib 7, as shown in Fig. 8. Instead of these corrugations or projections the links may be roughened or scored in any suitable and appropriate way to reduce side slip or increase the tractive effect or to secure both of these results. When the links are provided with longitudinal corrugations, as is preferable, the tire engages such corrugations on the under side, (see Fig. 2,) so that the expanding pressure applied to the tire tends to hold the armor very securely in position thereon to effectively resist any tendency toward dislodgment when subjected to side strains.

Preferably the links comprising the armor are made slightly wider than the width of the tire to prevent puncturing of the latter at the sides of the armor; but this is not strictly necessary. I also prefer to make the links of a width substantially equal to their length; but this proportion may obviously be varied without affecting the spirit of the invention.

Having now described my invention, what I claim as new, and desire to secure by Letters Patent, is as follows:

1. The combination with a pneumatic tire of a generally circular cross-section, of an armor therefor which is composed of a series of links, each formed of a single plate of sheet metal, generally rectangular in form and flat transversely, connected together to form an endless flexible band, engaging with the tread of the tire and free from the sides thereof, the said band being of less length than the outer face of the tire when the latter is inflated, whereby the tread of the tire will be flattened, and will engage with the links throughout their width, substantially as set forth.

2. The combination with a pneumatic tire of a generally circular cross-section, of an armor therefor which is composed of a series of links, each formed of a single plate of sheet metal, generally rectangular in form, curved longitudinally to the arc of a circle of less diameter than that of the wheel with the tire inflated, and flat transversely, connected, together to form an endless flexible band engaging with the tread of the tire and free from the sides thereof, the said band being of less length than the circumference of the inflated tire, whereby the tread of the latter will be flattened and will engage with the links throughout their width, substantially as set forth.

This specification signed and witnessed this 26th day of August, 1902.

JONAS W. AYLSWORTH.

Witnesses:
J. A. BOEHME,
J. F. RANDOLPH.